United States Patent
Lee (10) Patent No.: US 10,521,717 B2
(45) Date of Patent: Dec. 31, 2019

(54) REPRESENTATION OF WEIGHT VALUES IN AN ARTIFICIAL NEURAL NETWORK USING INTER-GROUP INDEXING

(71) Applicant: FUJITSU LIMITED, Kawasaki-shi, Kanagawa (JP)

(72) Inventor: Michael Lee, Saratoga, CA (US)

(73) Assignee: FUJITSU LIMITED, Kawasaki (JP)

( * ) Notice: Subject to any disclaimer, the term of this patent is extended or adjusted under 35 U.S.C. 154(b) by 680 days.

(21) Appl. No.: 15/235,017

(22) Filed: Aug. 11, 2016

(65) Prior Publication Data

US 2018/0046911 A1     Feb. 15, 2018

(51) Int. Cl.
*G06N 3/08*     (2006.01)
*G06N 3/10*     (2006.01)
*G06N 3/063*    (2006.01)

(52) U.S. Cl.
CPC ................ *G06N 3/08* (2013.01); *G06N 3/10* (2013.01); *G06N 3/063* (2013.01)

(58) Field of Classification Search
CPC ............ G06N 3/08; G06N 3/10; G06N 3/063; G06N 3/06
See application file for complete search history.

(56) References Cited

U.S. PATENT DOCUMENTS

2018/0032860 A1* 2/2018 Tan ..................... G06N 3/04

OTHER PUBLICATIONS

Song Han, Huizi Mao, and William J. Dally, Deep Compression: Compressing Deep Neural Networks With Pruning, Trained Quantization and Huffman Coding Feb. 15, 2016, ICLR.*
E. Erwin K. Obermayer and K. Schulten, Self-organizing maps: ordering, convergence properties and energy functions Jul. 22, 1991, Biological Cy.*
Wenlin Chen et al., "Compression Neural Network with the Hashing Trick," Department of Computer Science and Engineering, Washington University, Apr. 19, 2015.
Yunchao Gong et al., "Compression Deep Convolutional Networks Using Vector Quantization," ICLR 2015. Dec. 18, 2014.
(Continued)

*Primary Examiner* — Li B. Zhen
*Assistant Examiner* — Tewodros E Mengistu
(74) *Attorney, Agent, or Firm* — Maschoff Brennan (57) ABSTRACT

A computer-implemented method for representation of weight values in an artificial neural network using inter-group indexing may include, in an artificial neural network that includes neurons and synaptic connections between the neurons with each of the synaptic connections including a weight, arranging the weights in ascending order. The method may also include dividing the arranged weights into groups based on approximately linear patterns of the weights. The method may further include designating a base group and the other groups as dependent groups. The method may also include storing in memory values of the weights in the base group. The method may further include storing in the memory a group index for each of the dependent groups. The method may also include storing in the memory an index for each of the weights in the dependent groups corresponding to one of the weights in the base group without storing in the memory values of the weights in the dependent groups.

15 Claims, 9 Drawing Sheets

(56) References Cited

OTHER PUBLICATIONS

Song Han et al., "Deep Compression Compressing Deep Neural Network with Pruning, Trained Quantization and Huffman Coding," ICLR 2016, Oct. 27, 2015.
U.S. Appl. No. 15/062,067, filed Mar. 5, 2016.
U.S. Appl. No. 15/145,664, filed May 3, 2016.
U.S. Appl. No. 15/222,863, filed Jul. 28, 2016.
Extended European Search Report for European Application No. 17153482.9, dated Aug. 22, 2017.

* cited by examiner

REPRESENTATION OF WEIGHT VALUES IN AN ARTIFICIAL NEURAL NETWORK USING INTER-GROUP INDEXING

FIELD

The embodiments discussed herein are related to representation of weight values in an artificial neural network using inter-group indexing.

BACKGROUND

An artificial neural network utilizes a network of neurons to perform complex cognitive tasks. For example, tasks related to computer vision and speech recognition, which are very difficult to perform using the ordinary rule-based programming, can be performed using an artificial neural network.

The neurons of an artificial neural network may be configured to communicate with each other through synaptic connections between the neurons. Each synaptic connection between two neurons may be associated with a weight having a value which may be tuned to reflect the importance of communication between the two neurons. As an artificial neural network grows in size, the number of synaptic connections increases, resulting in a corresponding increase in the number of weights. However, since weight values are generally stored in memory, growth in the size of an artificial neural network can become problematic as the memory requirement for the weight values exceeds the available memory, resulting in the use of relatively slower storage as "virtual memory" which may dramatically slow the performance of the artificial neural network.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a computer-implemented method for representation of weight values in an artificial neural network using inter-group indexing may include, in an artificial neural network that includes neurons and synaptic connections between the neurons with each of the synaptic connections including a weight, arranging the weights in ascending order. The method may also include dividing the arranged weights into groups based on approximately linear patterns of the weights. The method may further include designating a base group and the other groups as dependent groups. The method may also include storing in memory values of the weights in the base group. The method may further include storing in the memory a group index for each of the dependent groups. The method may also include storing in the memory an index for each of the weights in the dependent groups corresponding to one of the weights in the base group without storing in the memory values of the weights in the dependent groups.

The objects and advantages of the embodiments may be realized and achieved at least by the elements, features, and combinations particularly pointed out in the claims.

It is to be understood that both the foregoing general description and the following detailed description are given as examples, are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments described herein relate to representation of weight values in an artificial neural network using inter-group indexing. The increased use of artificial neural networks in computer architectures to solve complex cognitive tasks has resulted in growth in the size of the artificial neural networks. This growth in the size of artificial neural networks is at times outpacing the increasing availability of memory in the computer architectures to store the corresponding increase in weight values of synaptic connections of the artificial neural networks. When memory in a computer architecture becomes full resulting in weight values being stored in relatively slower storage as "virtual memory," the performance of the artificial neural network may slow dramatically.

Some efforts to reduce the memory requirement for weight values in an artificial neural network involve clustering of weight values. Weight clustering generally includes reassigning all weight values in a range to a single discrete weight value. While weight clustering reduces the memory requirement for the weight values in an artificial neural network, weight clustering causes the reassigned weight values to suffer from a dramatic loss in accuracy, which degrades the performance of the artificial neural network.

The representation of weight values in an artificial neural network using inter-group indexing disclosed herein generally involves weights of the artificial neural network being arranged in ascending order and then the arranged weights being divided into groups based on approximately linear patterns of the weights, with one group designated as a base group and the other groups designated as dependent groups. The values of the weights in the base group are then stored in memory with the weights in the dependent groups being indexed to the weights in the base group. This inter-group indexing of the weights in the dependent groups to the weights in the base group enables the values of the weights in the dependent groups to be later synthesized with a relatively high degree of accuracy without ever storing the actual values of the weights in the dependent groups in memory, which reduces the memory requirement of the artificial neural network without suffering the dramatic loss in accuracy generally seen in weight clustering.

Embodiments of the present disclosure are now explained with reference to the accompanying drawings.

Figure 1:
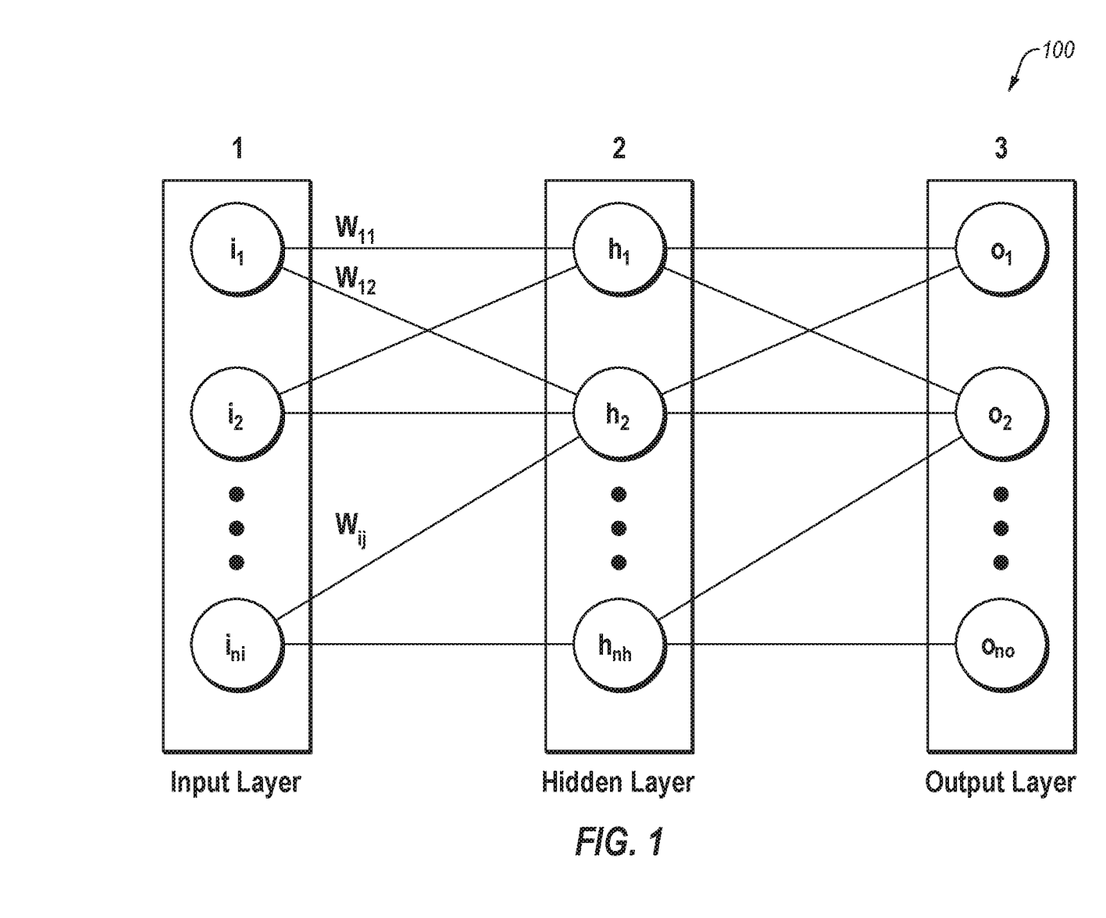
FIG. 1 is a diagram of an example artificial neural network.

FIG. 1 is a diagram of an example artificial neural network 100. The artificial neural network 100 may be used to perform complex cognitive tasks such as, but not limited to, computer vision and speech recognition. The artificial neural network 100 may include multiple layers of neurons such as an input layer of neurons a hidden layer of neuron $h_1$-$h_{nh}$, and an output layer of neuron $o_1$-$o_{no}$. The neurons in the input layer may communicate with the neurons $h_1$-$h_{nh}$ in the hidden layer, and the neurons $h_1$-$h_{nh}$ in the hidden layer may communication with the neurons $o_1$-$o_{no}$ in the output layer, using synaptic connections (represented by lines between the neurons in FIG. 1) that each has a weight w. For example, the synaptic connection between the neuron $i_1$ in the input layer and the neuron $h_1$ in the hidden layer has a weight $w_{11}$ and the synaptic connection between the neuron $i_1$ in the input layer and the neuron $h_2$ in the hidden layer has a weight $w_{12}$. Each weight w is used to tune the importance of communication over the synaptic connection between the two neurons.

As the artificial neural network 100 grows in size, the number of synaptic connections increases, resulting in a corresponding increase in the number of weights w. However, since weight values are generally stored in memory, growth in the size of the artificial neural network 100 can become problematic as the memory requirement for the weight values exceeds the available memory, resulting in the use of relatively slower storage as "virtual memory" which may dramatically slow the performance of the artificial neural network. To avoid this performance degradation, many or most of the weight values of the artificial neural network 100 may be represented in memory using inter-group indexing without ever storing the actual weight values in memory, which reduces the memory requirement of the artificial neural network 100 without sacrificing a dramatic loss in accuracy of the indexed weight values, as discussed below.

Figure 2:
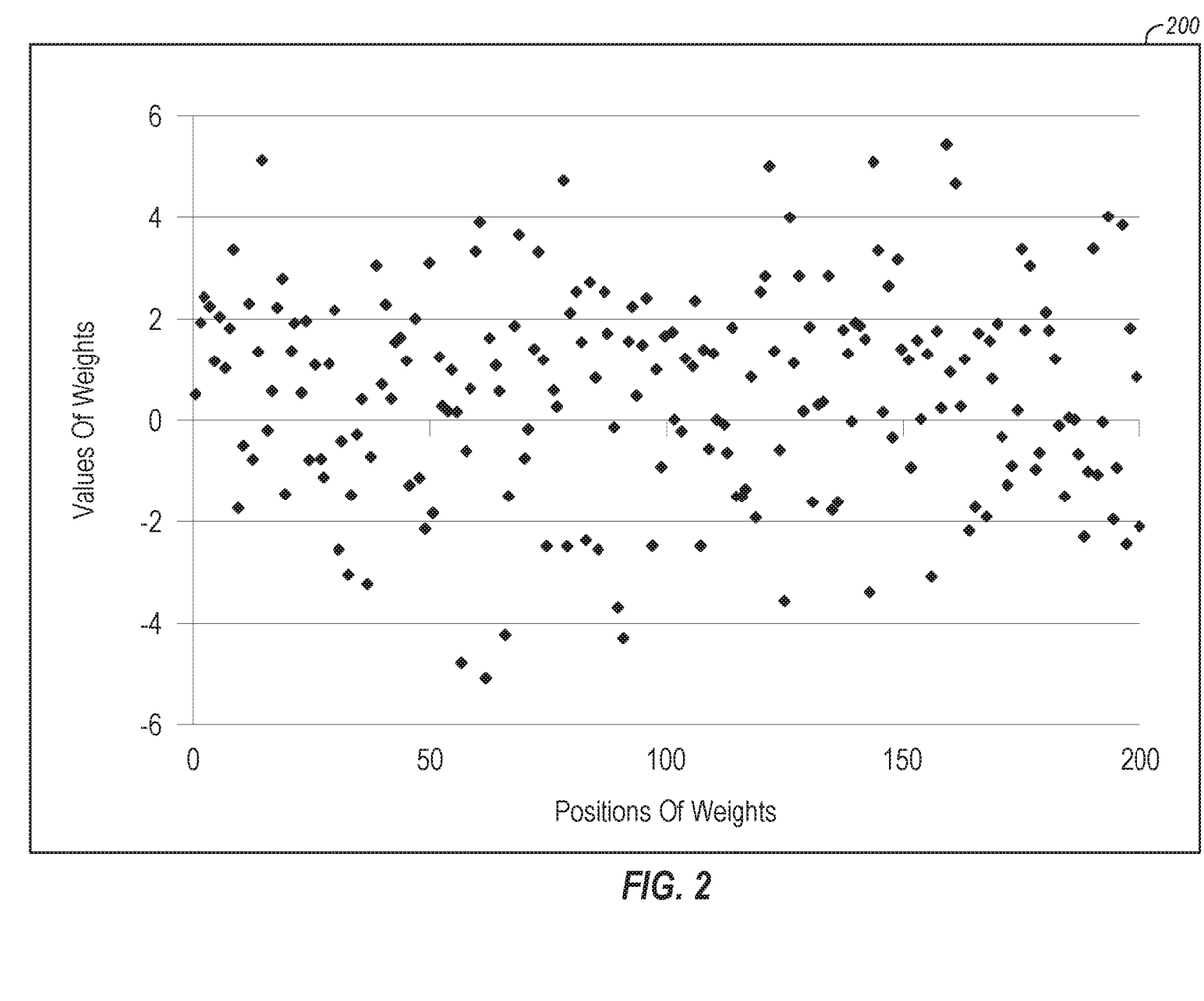
FIG. 2 is a chart of example positions and values of weights in the artificial neural network of FIG. 1.

FIG. 2 is a chart 200 of example positions and values of weights w in the artificial neural network 100 of FIG. 1. As disclosed in FIGS. 1 and 2, the weight values in the artificial neural network 100 range between −6.0 and 6.0 and correspond to weights of synaptic connections having various sequential positions in the artificial neural network 100. For example, the weight at position 1 may be the weight $w_{11}$ and the weight and position 2 may be the weight $w_{12}$.

Figure 3:
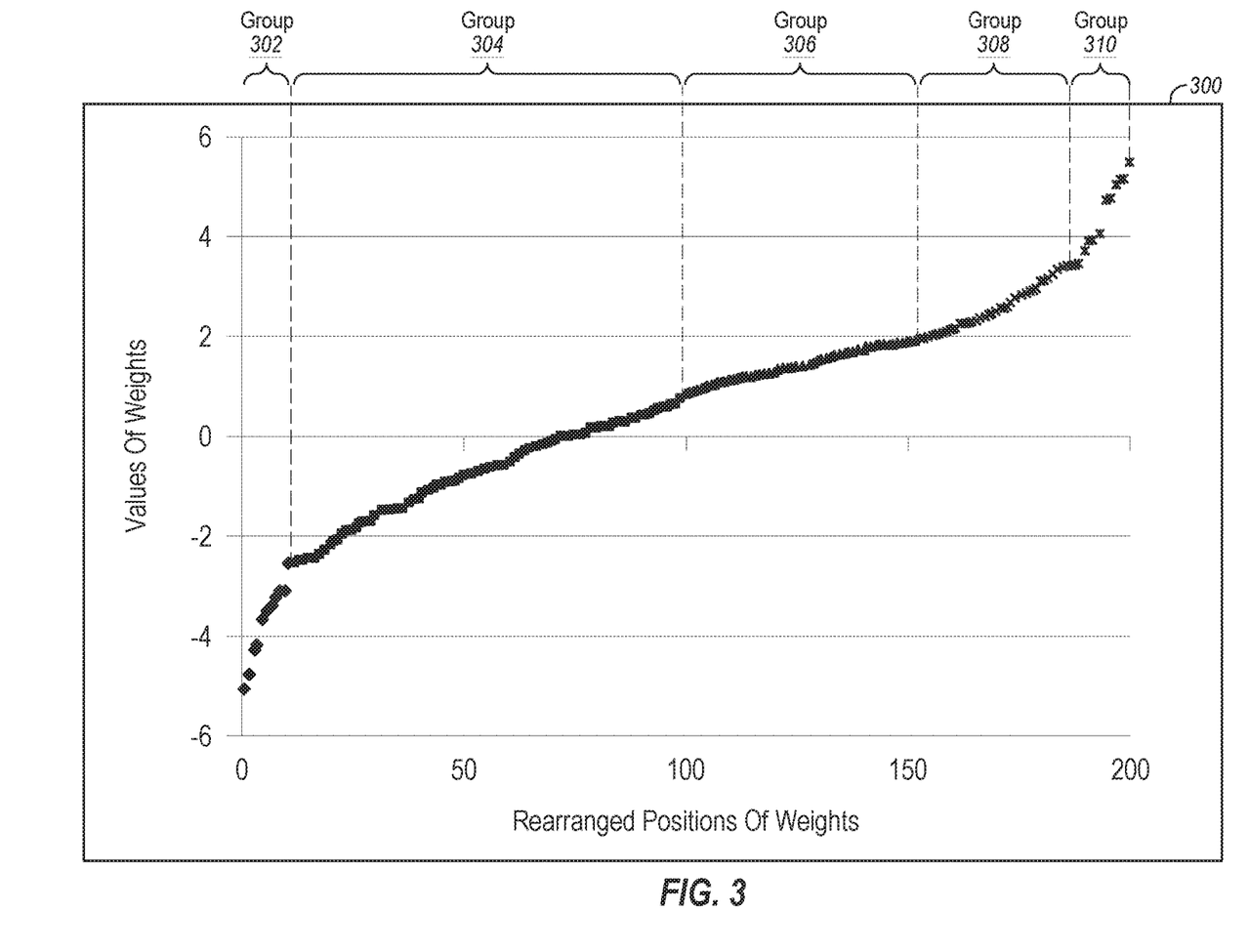
FIG. 3 is a chart of the example positions and values of the weights of FIG. 2 after having been arranged in ascending order and divided into groups.

FIG. 3 is a chart 300 of the example positions and values of the weights w of FIG. 2 after having been arranged in ascending order and divided into groups. This arranging of weights in ascending order and dividing of weights into groups may be performed during the inter-group indexing disclosed herein.

As disclosed in FIGS. 1-3, the dividing of the weights w into groups may be based on approximately linear patterns of the weights. For example, since the weight values between positions 0-13 exhibit a first approximately linear pattern, and the weight values between positions 14-99 exhibit a second approximately linear pattern that has a different approximate slope than the first approximately linear pattern, the weights between positions 0-13 may be grouped into the group 302, and the weights between positions 14-99 may be grouped into the group 304.

Also disclosed in FIGS. 1-3, one of the groups 302-310 may be designated as a base group and the other groups may be designated as dependent groups. This designating may include designating the group having the approximately linear pattern that is the most linear as the base group. For example, since the approximately linear pattern of the group 304 is the most linear of the groups 302-310, the group 304 may be designated as a base group, and the groups 302 and 306-310 may be designated as dependent groups. In another example, the designating of the base group may include designating a virtual group as the base group. For example, a virtual group that is not included in the groups 302-310 may be designated as the base group, and all of the groups 302-310 may be designated as dependent groups. This designating of a base group and dependent groups may be performed as part of the inter-group indexing disclosed herein in order to enable weight values of the weights in the base group to be stored in memory and then index weight values of the weights in the dependent group to the weights in the base group to avoid having to store in the memory the weight values of the weights in the dependent groups. Instead of weight values, minimal data for each dependent group may be stored in memory. For example, a group index may be assigned and stored in memory for each of the dependent groups.

Figure 4:
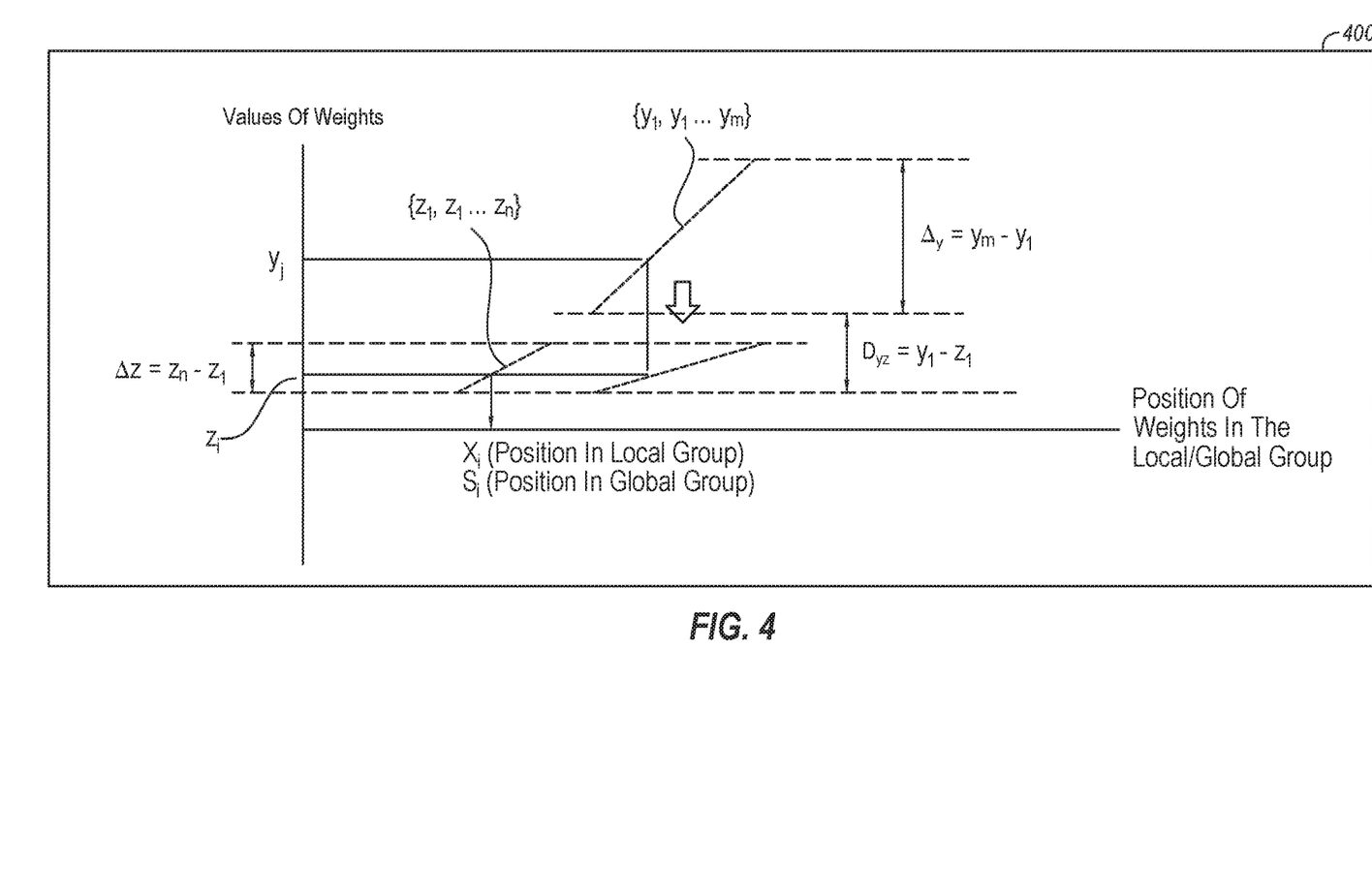
FIG. 4 is a chart of one of the weights in an example dependent group being indexed to one of the weights in an example base group.

FIG. 4 is a chart 400 of one of the weights in an example dependent group being indexed to one of the weights in an example base group. In particular, the chart 400 discloses a weight value $y_j$ of a weight in a dependent group being indexed to a weight value $z_i$ of a weight in a base group. For example, the weight value $y_j$ from the dependent group may be indexed to the weight value $z_i$ of the base group, and the approximate weight value $y_j^*$ may be obtained, according to the following formula:

$$y_j^* = \frac{\Delta y}{\Delta z}(z_i - z_1) + D_{yz}$$

where:

$\Delta y$ is the difference between the highest weight value $y_m$ and the lowest weight value $y_1$ in the dependent group;

$\Delta z$ is the difference between the highest weight value $z_n$ and the lowest weight value $z_1$ in the base group; and $D_{yz}$ is the difference between the lowest weight value $y_1$ in the dependent group and the lowest weight $z_1$ in the base group.

Using this equation in the chart 400 of FIG. 4, the values of weights from a base group can be stored in memory, and then indexes for the weights in the dependent group that correspond to the weights in the base group can be stored in the memory without storing in the memory values of the weights in the dependent groups, which reduces the memory requirement of the artificial neural network.

Figure 5:
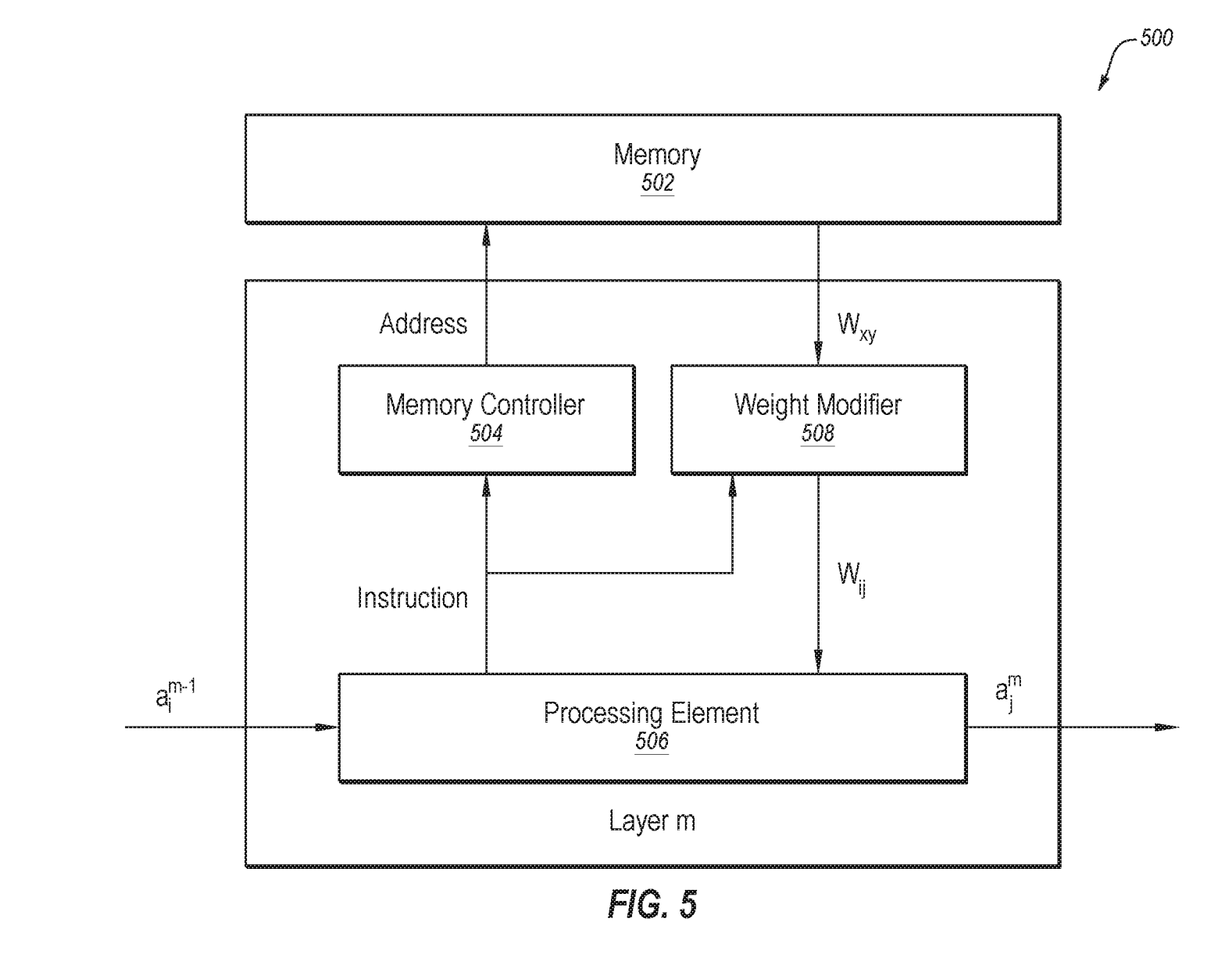
FIG. 5 is a diagram of an example computer architecture for inter-group indexing.

FIG. 5 is a diagram of an example computer architecture 500 for inter-group indexing. The computer architecture 500 may include memory 502, a memory controller 504, a processing element 506, and a weight modifier 508.

The processing element 506 of FIG. 5 may be configured to create or access an artificial neural network and perform the inter-group indexing disclosed herein. In particular, the processing element 506 may be configured to perform the arranging of weights and dividing weights into groups disclosed in connection with FIG. 3, as well as the storing of the weight values from a base group and indexes for the weights in dependent groups disclosed in connection with FIG. 4. Further, the processing element 506 may be configured to calculate slope and intercept modifiers for each of the dependent groups. For example, with reference again to FIG. 4, the slope modifier of a dependent group may be represented as:

$$\frac{\Delta y}{\Delta z}$$

Similarly, the intercept modifier of a dependent group may be represented as:

$D_{yz}$

After the processing element 506 calculates the slope and intercept modifiers for each of the dependent groups, the processing element 506 may be configured to store these slope and intercept modifiers in the memory 502 using the memory controller 504.

The weight modifier 508 of FIG. 5 may be configured for use in synthesizing values of weights in dependent groups. For example, the weight modifier 508 may be configured to synthesize the value of a weight $w_{ij}$ of a synaptic connection between a first neuron $a_i^{m-1}$ in a first layer and a second neuron $a_j^m$ in a second layer in an artificial neural network, where:

i is the neuron index in the first layer;
j is the neuron index in the second layer; and
m is a layer index.

In order to synthesize the value of the weight $w_{ij}$, the weight modifier 508 may be configured to retrieve from the memory 502 the slope and intercept modifiers for the dependent group to which the $w_{ij}$ belongs, retrieve from the memory 502 the index of one of the weight $w_{ij}$, and retrieve from the memory 502 the value of the weight $w_{xy}$ in the base group to which the retrieved index corresponds. The weight modifier 508 may then be configured to synthesize the weight $w_{ij}$ in the dependent group using the retrieved index of the weight, the retrieved slope and intercept modifiers of the dependent group, and the retrieved value of the weight $w_{xy}$ in the base group, and thereby calculate a synthesized weight value $y_j^*$ according to the formula of FIG. 4.

Figure 6:
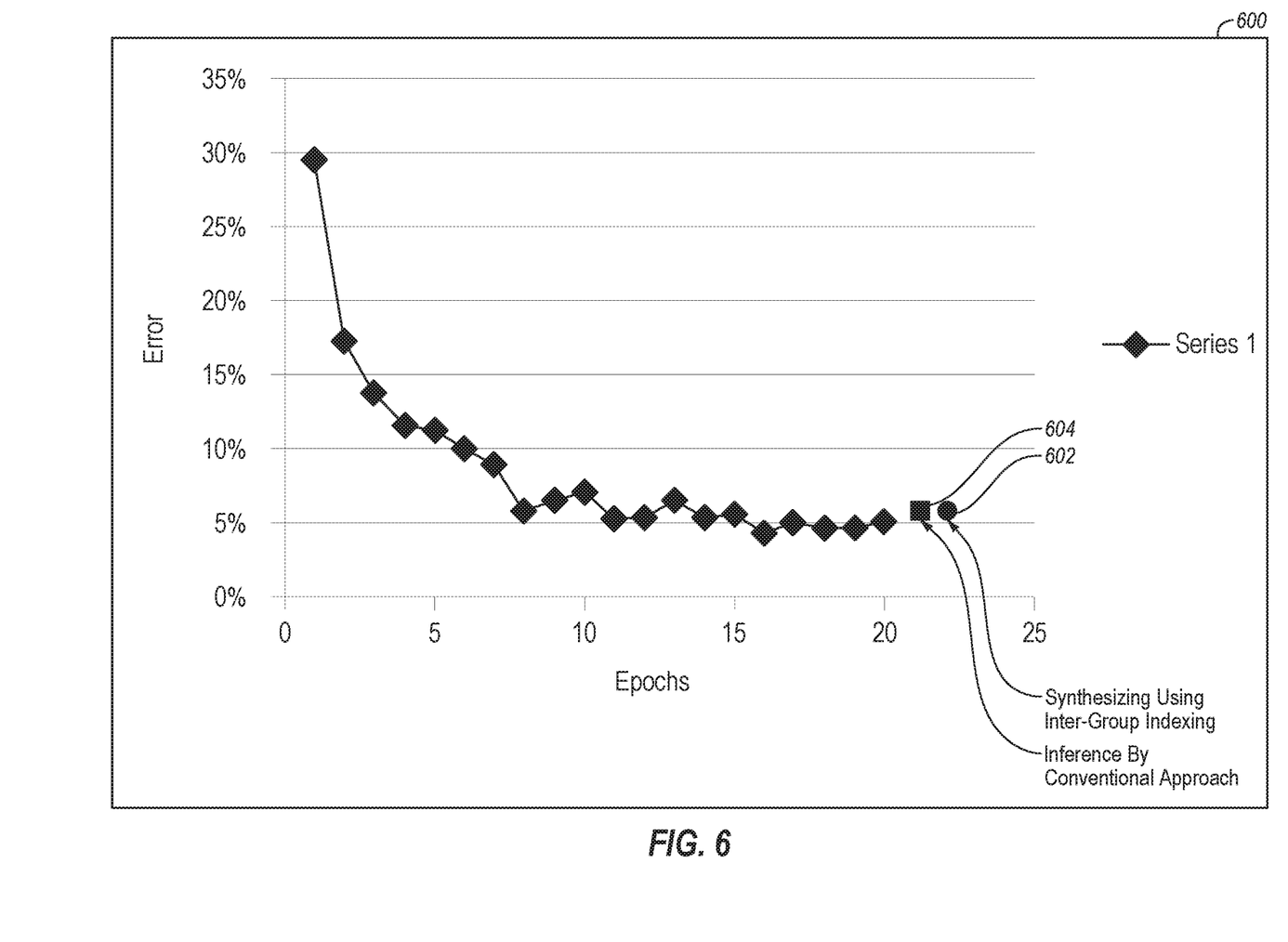
FIG. 6 is a chart of example simulation results using inter-group indexing.

FIG. 6 is a chart 600 of example simulation results using inter-group indexing. The chart 600 illustrates that a simulation result 602 using synthesized weight value $y_j^*$ by inter-group indexing that was comparable in accuracy to the simulation result 604 obtained using a conventional approach.

Figure 7:
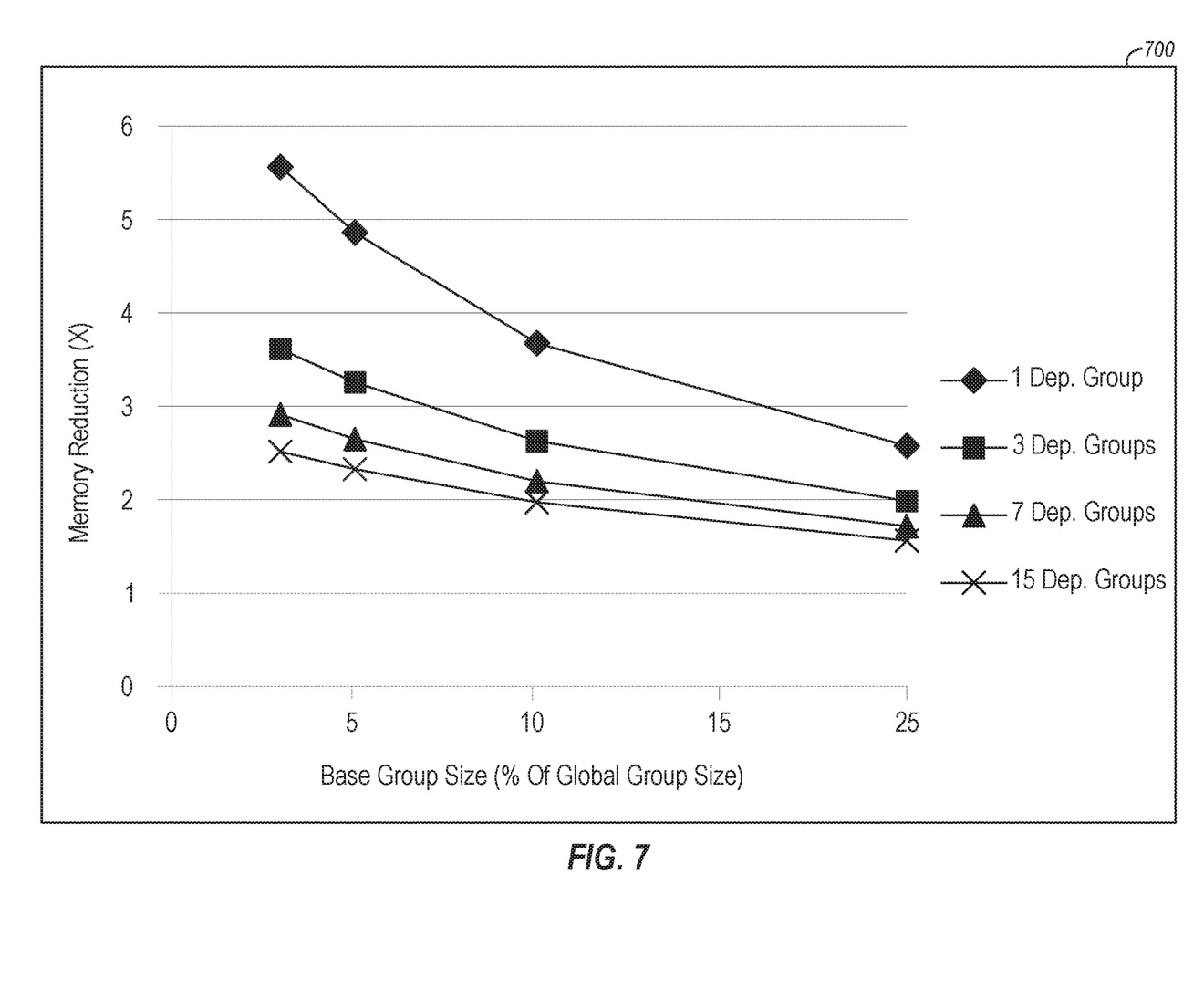
FIG. 7 is a chart of example estimated reduction of memory usage using inter-group indexing.

FIG. 7 is a chart 700 of example estimated reduction of memory usage using inter-group indexing. The chart 700 illustrates that the estimated reduction of memory usage using inter-group indexing increases by between about 1.5 times and about 5.5 times depending on the percentage of the total number of weights assigned to the base group and based on the number of dependent groups.

Figure 8:
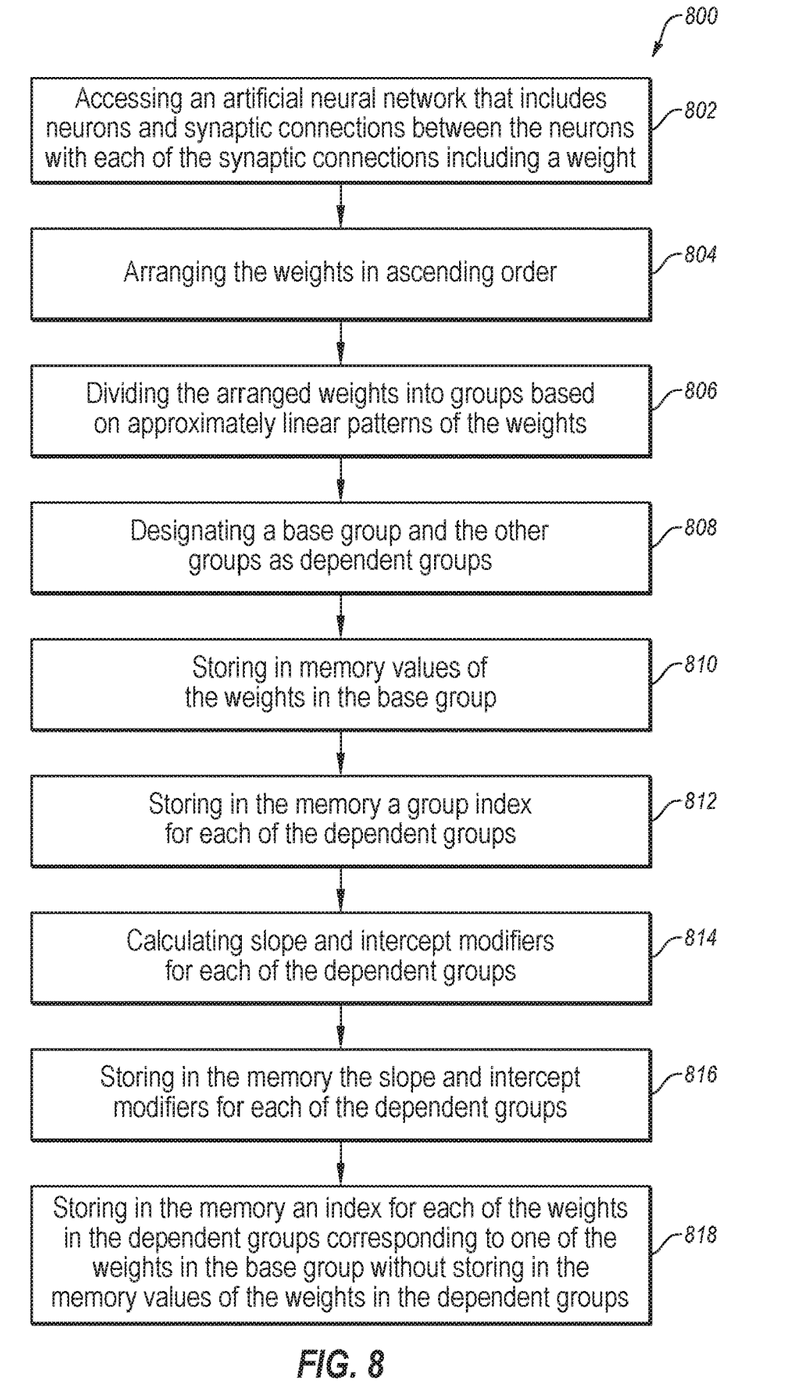
FIG. 8 is a flowchart of an example method for representation of weight values in an artificial neural network using inter-group indexing.

FIG. 8 is a flowchart of an example method 800 for representation of weight values in an artificial neural network using inter-group indexing, arranged in accordance with at least one embodiment described in the present disclosure. The method 800 may be implemented, in some embodiments, by the processing element 506 of the computer architecture 500 of FIG. 5. Although illustrated as discrete blocks, various blocks may be divided into additional blocks, combined into fewer blocks, or eliminated, depending on the target implementation.

The method 800 may begin at block 802, when an artificial neural network may be accessed. The artificial neural network may include neurons and synaptic connections between the neurons with each of the synaptic connections including a weight. For example, the artificial neural network may be similar to the artificial neural network 100 of FIG. 1.

At block 804, the weights may be arranged in ascending order. The ascending order of the weights may be based on the values of the weights. In at least some embodiments, the values of the weights may be floating point numbers. For example, the weights may be arranged in ascending order similar to the manner in which the weights disclosed in FIG. 2 were arranged in ascending order as disclosed in FIG. 3.

At block 806, the arranged weights may be divided into groups based on approximately linear patterns of the weights. For example, where all of the values of a set of weights fall in a line with an approximately linear slope, this set of weights may be divided into a group. For example, the arranged weights may be divided into groups in a similar manner as the arranged weights in FIG. 3 were divided into groups 302-310.

At block 808, a base group may be designated and the other groups may be designated as dependent groups. In at least some embodiments, the designating of the base group may include designating the group having the approximately linear pattern that is the most linear as the base group. For example, a base group may be designated and the other groups may be designated as dependent groups similar to the manner in which the group 304 was designated as a base group and the groups 302, 306, 308, and 310 were designated as dependent groups. Alternatively, the designating of the base group may include designating a virtual group as the base group.

At block 810, the values of the weights in the base group may be stored in memory. As noted previously, the values of the weights in the base group may be stored in memory as floating point numbers. The memory may be similar to the memory 502 of the computer architecture 500 of FIG. 5, for example.

At block 812, a group index for each of the dependent groups may be stored in memory.

At block 814, slope and intercept modifiers may be calculated for each of the dependent groups. For example, the slope and intercept modifiers may be similar to the slope and intercept modifiers disclosed in connection with FIG. 5.

At block 816, the slope and intercept modifiers for each of the dependent groups may be stored in memory.

At block 818, an index for each of the weights in the dependent groups corresponding to one of the weights in the base group may be stored in the memory without storing in the memory values of the weights in the dependent groups. For example, the index may be calculated using the formula disclosed in FIG. 4.

The method 800 may therefore be employed to represent weight values in an artificial neural network using inter-group indexing which may include storing the values of the weights in the base group in memory and only indexing the weights in the dependent groups to the weights in the base group. This inter-group indexing of the weights in the dependent groups to the weights in the base group enables the values of the weights in the dependent groups to be later synthesized with a relatively high degree of accuracy, as disclosed below in connection with FIG. 9, without ever storing the actual values of the weights in the dependent groups in memory, which reduces the memory requirement of the artificial neural network without suffering the dramatic loss in accuracy generally seen in weight clustering.

Figure 9:
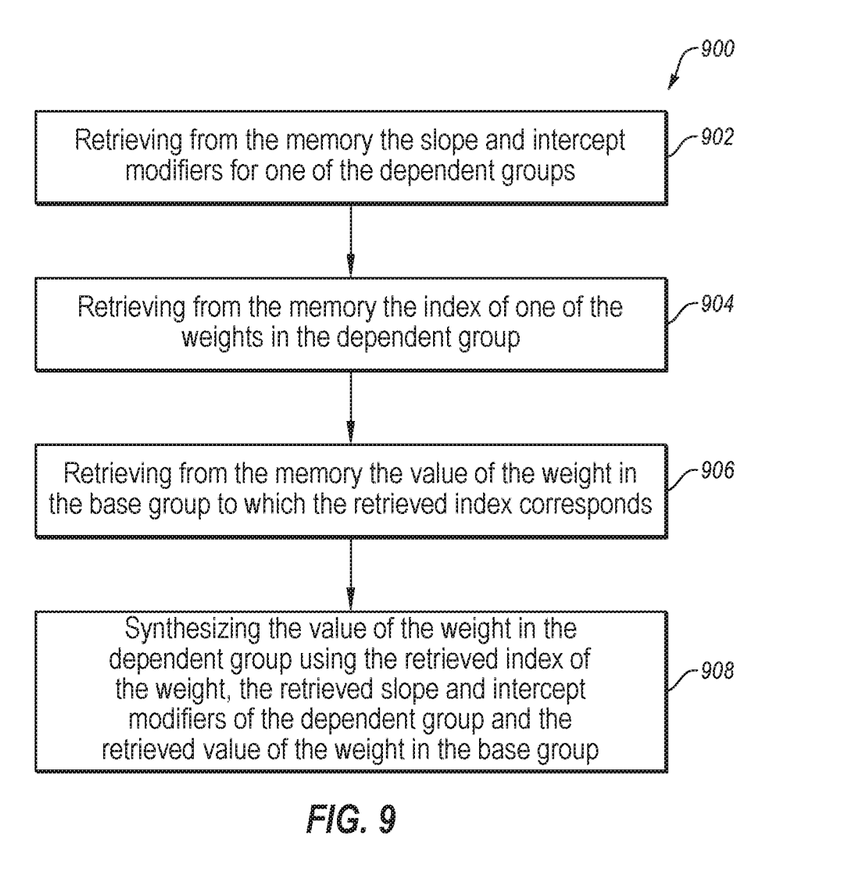
FIG. 9 is a flowchart of another example method for representation of weight values in an artificial neural network using inter-group indexing.

FIG. 9 is a flowchart of another example method 900 for representation of weight values in an artificial neural network using inter-group indexing, arranged in accordance with at least one embodiment described in the present disclosure. The method 900 may be implemented, in some embodiments, by the weight modifier 508 of the computer architecture 500 of FIG. 5. In addition, the method 900 may be implemented, in general, after implementation of the method 800. Although illustrated as discrete blocks, various blocks may be divided into additional blocks, combined into fewer blocks, or eliminated, depending on the target implementation.

The method 900 may begin at block 902, when the slope and intercept modifiers for one of the dependent groups may be retrieved from the memory. For example, the slope and intercept modifiers that were stored in the memory in block 814 of method 800 may be retrieved from the memory.

At block 904, the index of one of the weights in the dependent group may be retrieved from the memory. For example, the index of one of the weights in the dependent group that was stored in the memory in block 816 of method 800 may be retrieved from the memory.

At block 906, the value of the weight in the base group to which the retrieved index corresponds may be retrieved from the memory. For example, the value of the weight in the base group to which the retrieved index corresponds that was stored in the memory in block 810 of method 800 may be retrieved from the memory.

At block 908, the value of the weight in the dependent group may be synthesized using the retrieved index of the weight, the retrieved slope and intercept modifiers of the dependent group, and the retrieved value of the weight in the base group. For example, the synthesized value may be calculated using the formula disclosed in connection with FIG. 5.

The method 900 may therefore be employed to represent weight values in an artificial neural network using inter-group indexing which may enable values of the weights in dependent groups to be synthesized with a relatively high degree of accuracy without ever storing the actual values of the weights in the dependent groups in memory, which reduces the memory requirement of the artificial neural network without suffering the dramatic loss in accuracy generally seen in weight clustering.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A computer-implemented method for representation of weight values in an artificial neural network using inter-group indexing, the method comprising:
   in an artificial neural network that includes neurons and synaptic connections between the neurons with each of the synaptic connections including a weight, arranging the weights in ascending order;
   dividing the arranged weights into groups based on approximately linear patterns of the weights;
   designating a base group and the other groups as dependent groups;
   storing in memory values of the weights in the base group;
   storing in the memory a group index for each of the dependent groups;
   calculating slope and intercept modifiers for each of the dependent groups;
   storing in the memory the slope and intercept modifiers for each of the dependent groups;
   storing in the memory an index for each of the weights in the dependent groups corresponding to one of the weights in the base group without storing in the memory values of the weights in the dependent groups;
   retrieving from the memory the slope and intercept modifiers for one of the dependent groups;
   retrieving from the memory the index of one of the weights in the one of the dependent groups;

retrieving from the memory the value of the weight in the base group to which the retrieved index corresponds; and synthesizing the weight in the dependent group using the retrieved index of the weight, the retrieved slope and intercept modifiers of the one of the dependent groups, and the retrieved value of the weight in the base group.

2. The computer-implemented method of claim 1, wherein the designating of the base group includes designating the group having the approximately linear pattern that is the most linear as the base group.

3. The computer-implemented method of claim 1, wherein the designating of the base group includes designating a virtual group as the base group.

4. The computer-implemented method of claim 1, wherein the storing in the memory of the values of the weights in the base group includes storing in the memory the values of the weights in the base group as floating point numbers.

5. The computer-implemented method of claim 4, wherein the storing in the memory of the index for each of the weights in the dependent groups corresponding to one of the weights in the base group without storing in the memory the values of the weights in the dependent groups includes storing in the memory the index as an integer number for each of the weights in the dependent groups corresponding to one of the weights in the base group without storing in the memory the values of the weights in the dependent groups as floating point numbers.

6. A non-transitory computer-readable storage media including computer-executable instructions configured to cause a system to perform operations for representation of weight values in an artificial neural network using inter-group indexing, the operations comprising:

in an artificial neural network that includes neurons and synaptic connections between the neurons with each of the synaptic connections including a weight, arranging the weights in ascending order;

dividing the arranged weights into groups based on approximately linear patterns of the weights;

designating a base group and the other groups as dependent groups;

storing in memory values of the weights in the base group;

storing in the memory a group index for each of the dependent groups;

calculating slope and intercept modifiers for each of the dependent groups;

storing in the memory the slope and intercept modifiers for each of the dependent groups;

storing in the memory an index for each of the weights in the dependent groups corresponding to one of the weights in the base group without storing in the memory values of the weights in the dependent groups;

retrieving from the memory the slope and intercept modifiers for one of the dependent groups;

retrieving from the memory the index of one of the weights in the one of the dependent groups;

retrieving from the memory the value of the weight in the base group to which the retrieved index corresponds; and synthesizing the weight in the dependent group using the retrieved index of the weight, the retrieved slope and intercept modifiers of the one of the dependent groups, and the retrieved value of the weight in the base group.

7. The non-transitory computer-readable storage media of claim 6, wherein the designating of the base group includes designating the group having the approximately linear pattern that is the most linear as the base group.

8. The non-transitory computer-readable storage media of claim 6, wherein the designating of the base group includes designating a virtual group as the base group.

9. The non-transitory computer-readable storage media of claim 6, wherein the storing in the memory of the values of the weights in the base group includes storing in the memory the values of the weights in the base group as floating point numbers.

10. The non-transitory computer-readable storage media of claim 9, wherein the storing in the memory of the index for each of the weights in the dependent groups corresponding to one of the weights in the base group without storing in the memory the values of the weights in the dependent groups includes storing in the memory the index as an integer number for each of the weights in the dependent groups corresponding to one of the weights in the base group without storing in the memory the values of the weights in the dependent groups as floating point numbers.

11. A computer architecture for representation of weight values in an artificial neural network using inter-group indexing, the computer architecture comprising:

memory;

a processing element configured to:
    access an artificial neural network that includes neurons and synaptic connections between the neurons with each of the synaptic connections including a weight;
    arrange the weights in ascending order;
    divide the arranged weights into groups based on approximately linear patterns of the weights;
    designate a base group and the other groups as dependent groups;
    store in the memory values of the weights in the base group;
    store in the memory a group index for each of the dependent groups;
    calculate slope and intercept modifiers for each of the dependent groups;
    store in the memory the slope and intercept modifiers for each of the dependent groups; and
    store in the memory an index for each of the weights in the dependent groups corresponding to one of the weights in the base group without storing in the memory values of the weights in the dependent groups; and a weight modifier configured to:
    retrieve from the memory the slope and intercept modifiers for one of the dependent groups;
    retrieve from the memory the index of one of the weights in the one of the dependent groups;
    retrieve from the memory the value of the weight in the base group to which the retrieved index corresponds; and
    synthesize the weight in the dependent group using the retrieved index of the weight, the retrieved slope and intercept modifiers of the one of the dependent groups, and the retrieved value of the weight in the base group.

12. The computer architecture of claim 11, wherein the designating of the base group includes designating the group having the approximately linear pattern that is the most linear as the base group.

13. The computer architecture of claim 11, wherein the designating of the base group includes designating a virtual group as the base group.

14. The computer architecture of claim 11, wherein the storing in the memory of the values of the weights in the base group includes storing in the memory the values of the weights in the base group as floating point numbers.

15. The computer architecture of claim 14, wherein the storing in the memory of the index for each of the weights in the dependent groups corresponding to one of the weights in the base group without storing in the memory the values of the weights in the dependent groups includes storing in the memory the index as an integer number for each of the weights in the dependent groups corresponding to one of the weights in the base group without storing in the memory the values of the weights in the dependent groups as floating point numbers.

* * * * *